United States Patent
Coackley et al.

[15] 3,641,345
[45] Feb. 8, 1972

[54] INFRARED RADIOMETER APPARATUS FOR DETECTING CLEAR-AIR TURBULENCE FROM AN AIRCRAFT

[72] Inventors: Robert Coackley; Michael Leslie Reynolds, both of Camberley; Clive Douglas Rodgers, Oxford, all of England

[73] Assignee: National Research Development Corporation, London, England

[22] Filed: Mar. 5, 1970

[21] Appl. No.: 16,922

[30] Foreign Application Priority Data

Mar. 6, 1969 Great Britain ...................... 11,868/69

[52] U.S. Cl. ..........................................250/83.3 H, 73/355
[51] Int. Cl. ........................................G01j 5/06, B01k 11/00
[58] Field of Search..............................250/83.3 H; 73/355 R

[56] References Cited

UNITED STATES PATENTS

| 3,475,963 | 11/1969 | Astheimer | 250/83.3 H X |
| 3,465,339 | 9/1969 | Marner | 250/83.3 H X |
| 3,551,678 | 12/1970 | Mitchell | 250/83.3 H |

Primary Examiner—James W. Lawrence
Assistant Examiner—Morton J. Frome
Attorney—Cushman, Darby & Cushman

[57] ABSTRACT

A radiometer apparatus suitable for use on a supersonic aircraft for clear-air turbulence detection includes means for operating at four selected wavelengths within an atmospheric absorption band, for example the $15\mu$ band of carbon dioxide. At any particular height of the aircraft each of a set of filters used to select the four selected wavelengths has a weighting function which depends on the effective absorption coefficient of the atmosphere at that wavelength and each indicates which part of the atmosphere ahead provides a significant contribution to the radiation measured by the apparatus. At longer wavelengths the atmosphere is opaque and the radiometer apparatus receives radiation from immediately in front of the aircraft. By generating suitable functions from the outputs of radiation passed by two or more of the filters it is possible to detect turbulence of the type looked for.

23 Claims, 9 Drawing Figures

INFRARED RADIOMETER APPARATUS FOR DETECTING CLEAR-AIR TURBULENCE FROM AN AIRCRAFT

The present invention relates to radiometer apparatus.

Atmospheric turbulence creates a continual hazard to air travel, both in terms of passenger discomfort and possible damage to aircraft, resulting in extreme cases to loss of machines and life. A particular type of turbulence, associated with clear air, is singularly dangerous as its location and presence is not predictable by normal meteorological procedure.

A considerable weight of evidence has been accumulated in the literature, showing that most cases of clear-air turbulence are associated with temperature gradients in the atmosphere. It is thought that a threshold temperature change of 0.1° per kilometer existing over several kilometers is associated with this phenomenon.

It is an object of the present invention to provide a radiometer capable of detecting such a temperature change remotely.

According to the present invention there is provided a radiometer including a detector sensitive to incident radiation from the atmosphere having only wavelengths in a first band within an absorption band of a given component of the atmosphere, a detector sensitive to incident radiation from the atmosphere having only wavelengths in a second band within the absorption band of the given component of the atmosphere, wherein the second band is such as to have a generalized absorption coefficient of a different magnitude from that of the first band, and an indicating device responsive to the difference in magnitude between the signal of the detected radiation in the first band and the signal of detected radiation in the second band.

The radiometer may further include a detector sensitive to incident radiation having wavelengths only in a third band within the absorption waveband wherein the third band is such as to have a generalized absorption coefficient which is large compared with that of the second band, and an indicating device may be responsive to the quotient of the said difference and the detected radiation in the third band.

The detector sensitive to incident radiation having a wavelength in the first band, the detector sensitive to incident radiation having a wavelength in the second band and the detector sensitive to incident radiation having a wavelength in the third band may all be the same detector having alternative bandpass filters for the three respective pass bands. In fact a set of filters having relative absorption coefficients in ascending powers of two may provide for use of the radiometer at different pressure, and hence at different heights in the atmosphere.

An embodiment of the invention will be described by way of example with reference to the drawings accompanying this specification in which.

Figure 1:
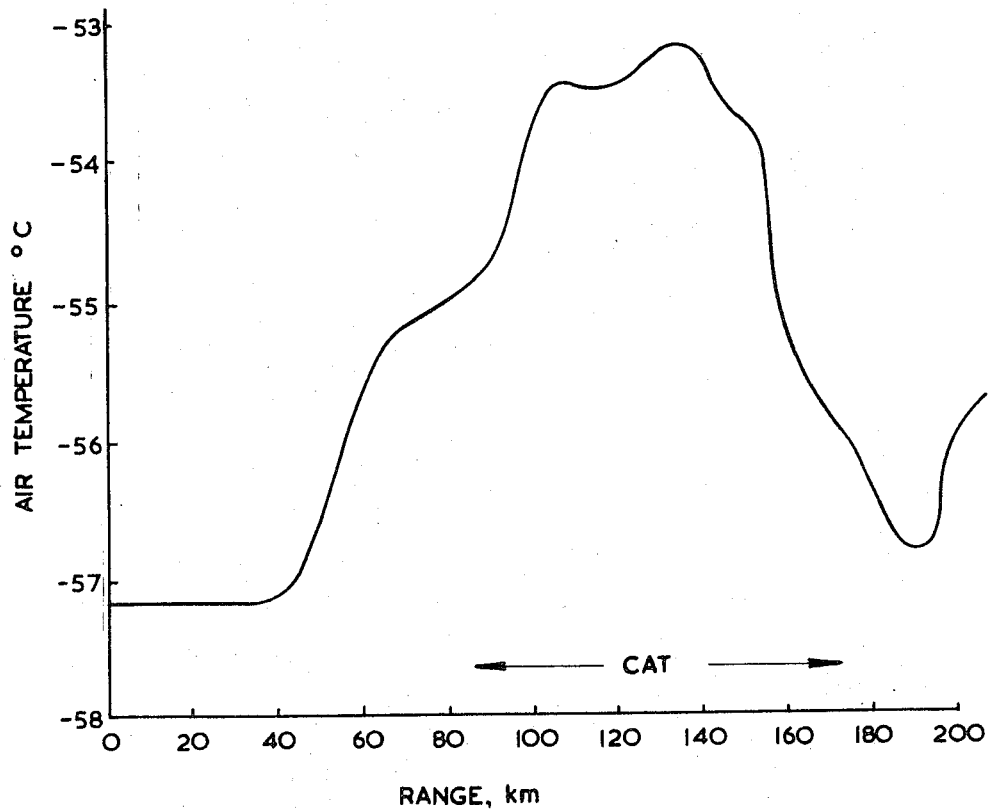
FIG. 1 is a graph of air temperature plotted against distance in a situation where clear turbulence was observed.

FIG. 1 is a graph of air temperature plotted against distance in a situation where clear-air turbulence was observed. The air temperature, which had an ambient value of some −57.2° C. rose by some 4° C. in a distance of some 60 kilometers, maintaining its higher temperature for some further 50 kilometers and falling towards its ambient value again in a distance of 40 kilometers. Moderate to severe clear-air turbulence was experienced in a range, indicated by the reference CAT in FIG. 1, some 80 kilometers in length, during this temperature change. A 4° C. temperature rise spread over several tens of kilometers may well be typical of clear-air turbulence.

Figure 2:
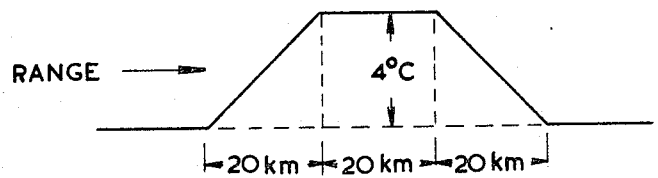
FIG. 2 is a diagram of a model temperature profile of clear-air turbulence used for calculating radiometer performance

FIG. 2 is a diagram of a model temperature profile of clear-air turbulence used for calculating radiometer performance. The range of the temperature step from the radiometer is measured at the very beginning of the temperature rise, as soon as the local temperature rises above ambient. The initial temperature gradient is assumed to be 4° C. distributed linearly over a 20-kilometer range distance, and thereafter the temperature is assumed to be constant and 4° C. above ambient for a further 20 kilometers, and finally the temperature is assumed to fall linearly down to ambient over a further distance of 20 kilometers. A temperature step with a profile like this should be detectable by an infrared radiometer. In other words, provided there exists a temperature step of this form then it should be possible to use an infrared radiometer to determine the existence and range of the temperature step provided that the radiometer is receptive to a wavelength in the infrared portion of the electromagnetic spectrum where there is radiation from the atmosphere.

If the absorptivity of a slab of the atmosphere as a function of wavenumber $\nu$ is $\alpha(\nu)$, then, by Kirchoff's law, it will emit radiation with power $\alpha(\nu)B(\alpha,\theta)$, where $B(\alpha,\theta)$ is the power that would be emitted by a black body at the temperature of the slab, $\theta$. If the slab is of thickness $dx$ at distance $x$ from a radiometer and $T(\nu,x)$ is the transmission function of the atmosphere, then $$\alpha(x) = \frac{T(x) - T(x+dx)}{T(x)} = -\frac{1}{T}\left(\frac{\partial T}{\partial x}\right) dx,$$

and the power reaching the radiometer from the slab is $$\alpha BT = B\left(-\frac{\partial T}{\partial x}\right) dx.$$

We may integrate over $x$ and $\nu$, including the spectral response of the radiometer, $f(\nu)$, to obtain the total power, S, reaching the radiometer:

$$S = \int\int f(\nu) B(\nu, x)\left(-\frac{\partial T}{\partial x}\right) dx\, d\nu.$$

(B can be expressed as a function of $x$ since $\theta$ is a function of $x$) If we make the assumption that $f(\nu)$ is sharply peaked at $\nu=\nu_o$ so that $B(\nu)$ does not differ appreciably from $B(\nu_o)$ over the wave number range, $\nu$, for which $f(\nu)$ is significant, the integral may be rewritten as $$S = \int_0^\infty B(\nu_0, x) K(x)\, dx, \qquad (1)$$

where $$K(x) = \int_{\Delta\nu} f(\nu)\left(-\frac{\partial T}{\partial x}\right) d\nu. \qquad (2)$$

The signal S is seen to be a weighted sum of black-body powers with weighting function $K(x)$.

We could use this expression to calculate S if we knew $T(\nu,x)$ and $\theta(x)$ and hence $K(x)$ and $B(\nu,x)$, but the inverse problem is of more interest. That is, given radiometer signals for several spectral regions, to deduce either $\theta(x)$ if T is known or to deduce T if $\theta(x)$ is known. Of course, it is only possible to deduce the form of a continuous function from the values of a finite number of signals describing the function in terms of parameters. In general, the more spectral intervals we measure, the more parameters we can determine.

The radiometer described is receptive to the 15-micron carbon dioxide absorption band which is reasonably close to the peak of the black-body curve at temperatures in the upper atmosphere (220° K.). Carbon dioxide has a sufficiently constant mixing ratio for the transmission to be calculated and the temperature structure deduced from the radiometer readings.

Figure 3:
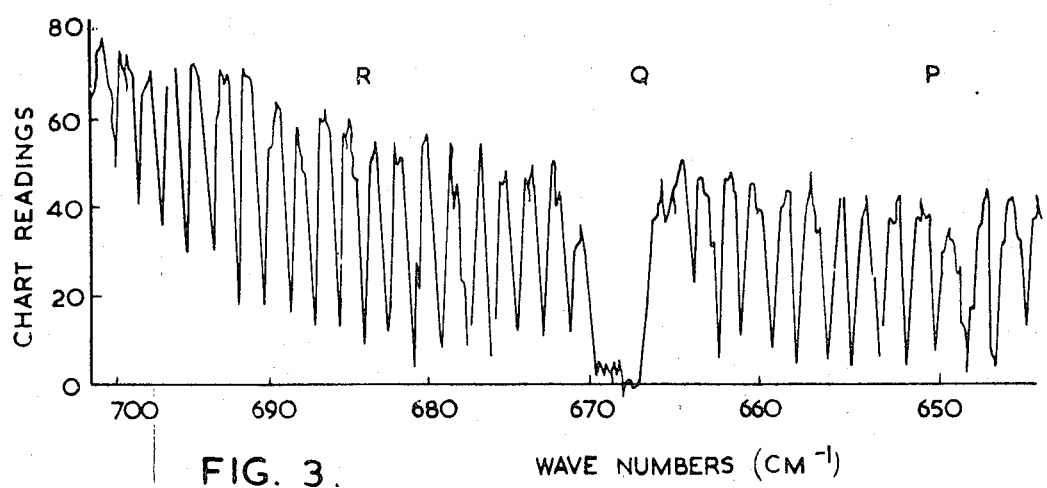
FIG. 3 is a graph of carbon dioxide absorption plotted against wave numbers.

FIG. 3 is a graph of carbon dioxide absorption plotted against wave numbers. The carbon dioxide spectrum consists of a narrow region of very strong absorption at a wave number of 668 cm.$^{-1}$ (the Q branch, so indicated in FIG. 3) corresponding to the frequency of the bending mode of vibration of the molecule, together with rotational sidebands (the P and R branches, so indicated in FIG. 3). The P and R branches consist of almost evenly spaced absorption lines, and, as these are about 1.5 cm.$^{-1}$ apart, and a typical radiometer bandwidth is 10 cm.$^{-1}$, it is the average absorption of such a band that is of interest.

Figure 4:
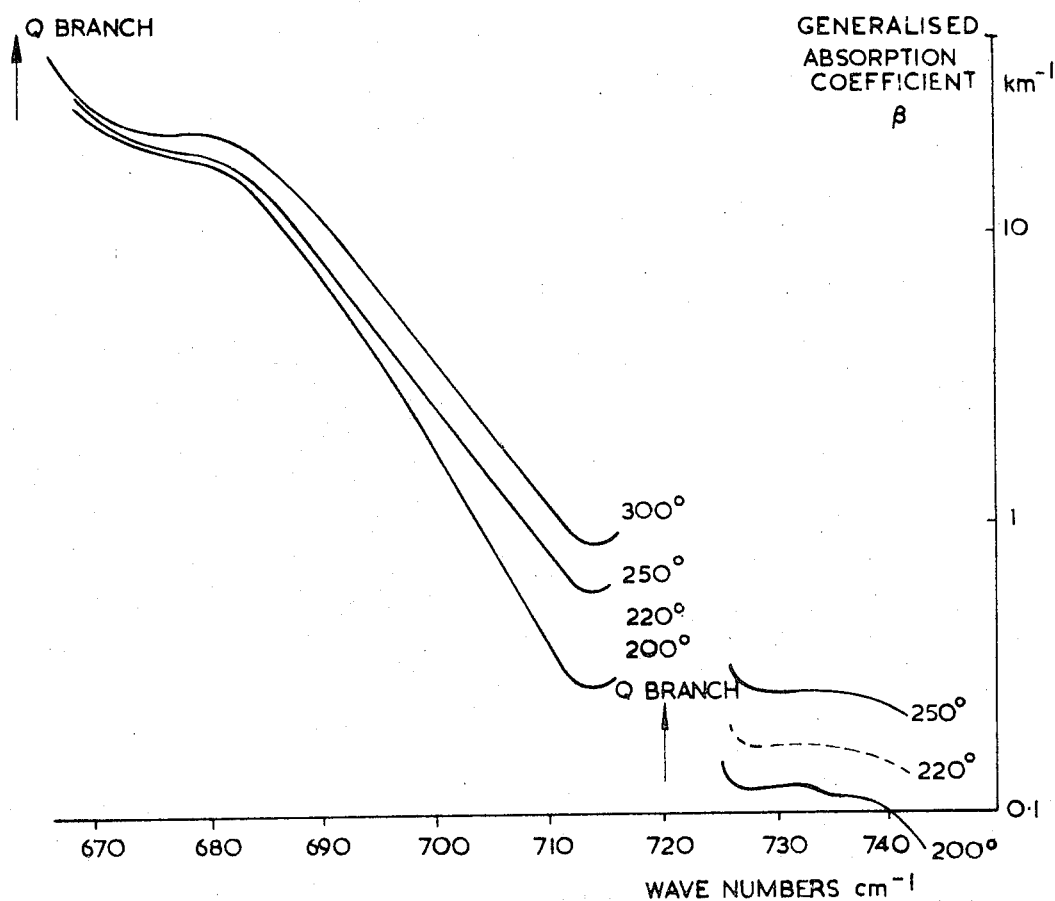
FIG. 4 is a graph of the generalized absorption coefficient of carbon dioxide integrated over intervals of five wave numbers.

FIG. 4 is a graph of the generalized absorption coefficient of carbon dioxide integrated over intervals of five wave numbers.

The generalized absorption coefficient $\beta$ has units of km$^{-1}$ and is given by
$$\beta = \pi S \alpha \mu \phi / \delta^2,$$
where $S$ = line strength in cm.$^{-1}$
$\alpha$ = line width in cm.$^{-1}$
$\mu$ = mixing ratio of carbon dioxide (mass/mass)
$\phi$ = pressure in millibars
$\delta$ = line spacing in cm.$^{-1}$
and the lines referred to are the absorption lines of FIG. 1. The absorption line widths $\alpha$ vary with pressure and the result is that the absorption coefficient $\beta$ is proportional to the square of the pressure. FIG. 4 shows its variation with wavelength and temperature. From having a high value (about 12 km.$^{-1}$) near the Q branch at 670 cm.$^{-1}$ the value of $\beta$ falls to below 1 km.$^{-1}$ at some 717 cm.$^{-1}$ near a second Q branch at 720 cm.$^{-1}$. The fall is more or less logarithmic between 683 cm.$^{-1}$ (where it has values around 11 at 300° K. and 10.5 at 200° K.) and 713 cm.$^{-1}$ (where it has values around 0.18 km.$^{-1}$ at 300° K. and 0.12 km.$^{-1}$ at 200° K.).

The radiometer embodying the invention is a multichannel infrared radiometer designed to measure the size of and the approximate range to an atmospheric temperature discontinuity similar to that illustrated in FIG. 2 from an aircraft flying between 30,000 and 60,000 feet. The radiometer operates at four selected wave lengths between 668 cm.$^{-1}$ and 720 cm.$^{-1}$ of one edge of the carbon dioxide absorption band. The instrument has to be so made that it can accommodate the different total absorption values which occur as the atmospheric pressure varies from about 300 mb. at 30,000 feet to 75 mb. at 60,000 feet. In fact the instrument is correctly calibrated at four specific heights, namely 212 mb. (37,000 feet), 150 mb. (45,000 feet), 106 mb. (52,000 feet) and 75 mb. (60,000 feet) by a suitable choice of infrared filters. Each set of filters is used at intermediate heights below the appropriate correctly calibrated level.

At any particular height each filter has associated with it an atmospheric weighting function. This weighting function depends on the effective absorption coefficient of the atmosphere at that wavelength (itself not a simple function) and indicates which part of the atmosphere ahead provides a significant contribution to the radiation measured by the instrument. Thus at the longer wavelengths where the atmosphere is very opaque the radiometer receives radiation from immediately in front of the aircraft so measuring the local temperature, whereas at the less attenuating wavelengths the radiation comes also from more remote sections of the line of sight. Because of the curvature of the earth, a horizontal line of sight is in fact a tangential path and will eventually emerge into space from an increasingly rarified atmosphere. Care must therefore be taken when choosing the filter for least attenuating wavelength that at this frequency the radiometer cannot receive radiation from outside the atmosphere. If it does so, that channel will give a false reading and moreover will be very susceptible to pitch errors since pitch angle significantly affects the effective distance to space.

Because of the increased rarity of the atmosphere as one ascends, the filter having the least absorption would eventually allow penetration by radiation from space. It is therefore necessary to discard this filter in favor of one at a different wavelength. By switching, carefully choosing the weighting functions used and the changeover height, it is possible to manage with only seven filters, used in the successive height bands. A suitable set of seven filters would have relative absorption coefficients at fixed pressure of 1, 2, 4, 8, 16, 32, and about 100. They would be used according to the height of the aircraft as shown in the following Table 1:

| Range of height feet | Range of pressure millibars | Relative absorption coefficients at fixed pressure |
|---|---|---|
| 30,000–37,500 | 300–212 | 1, 2, 4, ~100 |
| 37,500–45,000 | 212–150 | 2, 4, 8, ~100 |
| 45,000–52,000 | 150–106 | 4, 8, 16, ~100 |
| 52,000–59,000 | 106–75 | 8, 16, 32, ~100 |

Thus at any height range four filters will be in operation. These four filters will have different relative absorption coefficients and will therefore be sensitive to temperatures at different distances from the aircraft. For example the most absorbent filter (that with a relative absorption coefficient of about 100) will be sensitive only to the temperature immediately outside the radiometer. Therefore, by suitable combination of the outputs of four detectors having the four different relative absorption coefficients, or one detector having the four filters applied to it in turn, it should be possible to detect a temperature step of the sort illustrated in FIG. 2.

The frequencies transmitted by the seven filters are set out in the following Table 2:

| relative absorption coefficient | absolute absorption atmosphere coefficient $\beta$ at 220° K. at 1 atmosphere | frequency cm.$^{-1}$ | width of filter to transmission points |
|---|---|---|---|
| 1 | 0.3 | 713.5* | 8 |
| 2 | 0.6 | 710 | 10 |
| 4 | 1.2 | 705 | 10 |
| 8 | 2.4 | 699 | 10 |
| 16 | 4.8 | 694 | 10 |
| 32 | 9.6 | 687 | 10 |
| 100 | >20 | 667 | 16 |

*This filter must cut off at 717.5 cm.$^{-1}$ to avoid the Q branch at 720 cm.$^{-1}$.

Figure 5:
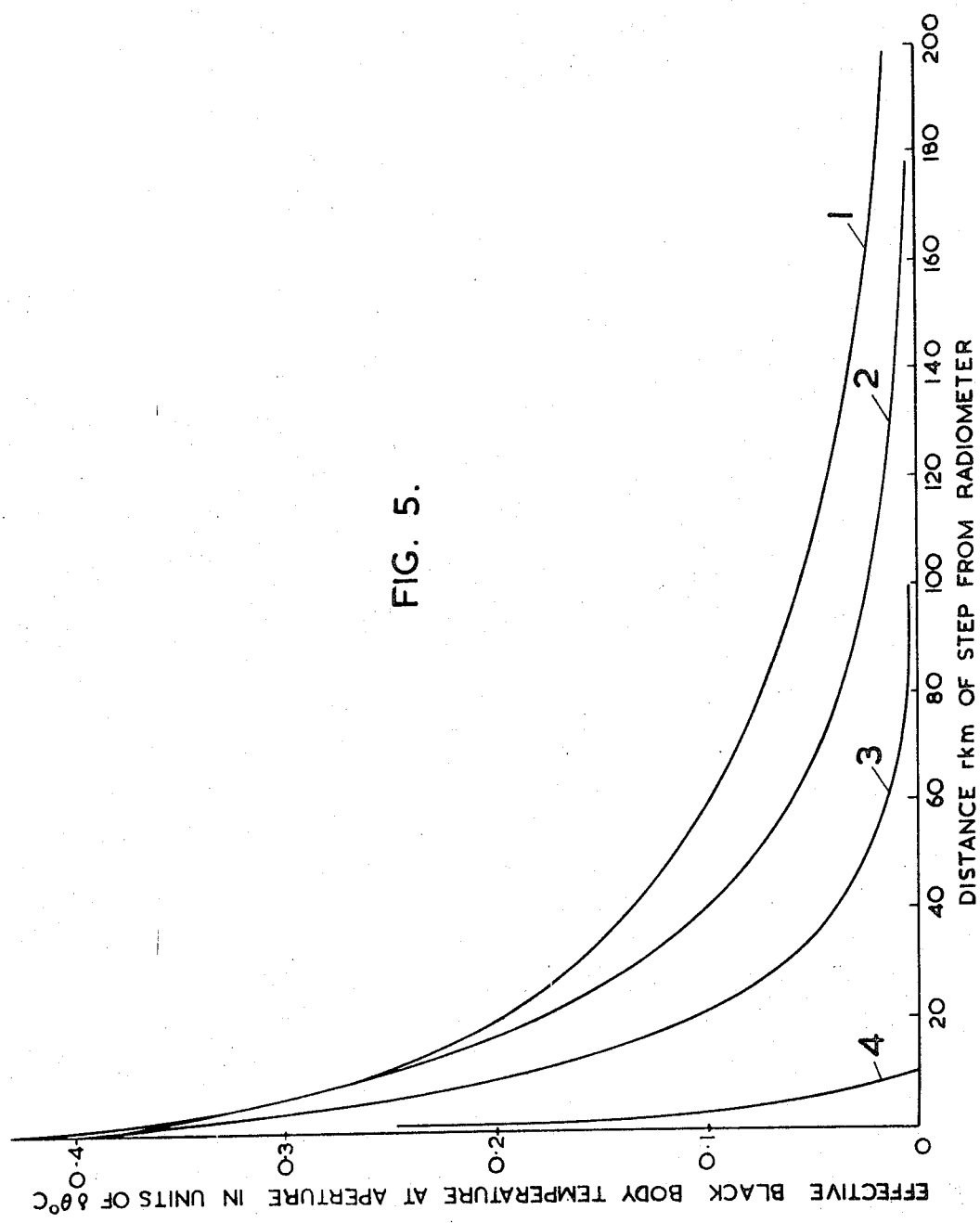
FIG. 5 is a graph of responses of a radiometer instrument channel to a model temperature step of the sort illustrated in FIG. 2.

Given the filters specified in Table 2 above, the responses of the four instrument channels to a temperature step such as that illustrated in FIG. 2 at the four design heights, i.e., the heights at which the filters are correctly calibrated, namely 37,000 feet, 45,000 feet, 52,000 feet and 60,000 feet will be as shown in FIG. 5. The response in each channel diminishes rapidly with distance, but channel 1 is still sensibly responsive to a temperature step 200 km. from the radiometer.

In order to detect a temperature step of the type illustrated in FIG. 2 a range function R is generated, where
$$R = (S_1 S_2)/(S_3 = S_4)$$
and $S_1$, $S_2$, $S_3$ and $S_4$ are the outputs of the four instrument channels of the radiometer in ascending order of absorption coefficient. The range function will be very sensitive to temperature steps some hundreds of kilometers in front of the aircraft.

Figure 6:
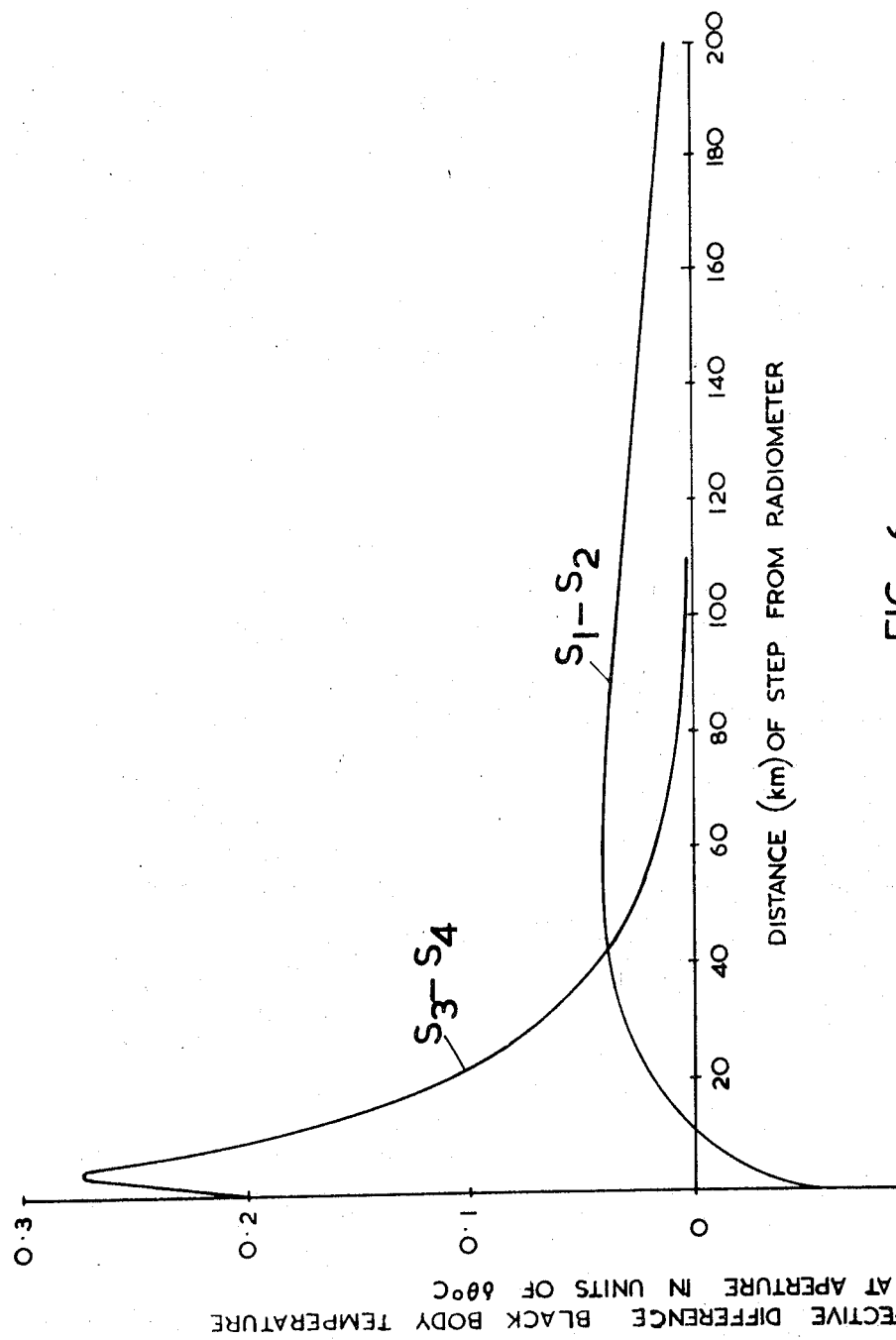
FIG. 6 is a graph of difference responses plotted against distance from a radiometer.

FIG. 6 is a graph of difference responses plotted against distances from the radiometer. A curve $S_1-S_2$ illustrates the difference between the outputs of the instrument channels $S_1$ and $S_2$ and a curve $S_3-S_4$ illustrates the difference between the outputs of the instrument channels $S_3$ and $S_4$. The numerator $S_1-S_2$ of the range function has a value at zero range equivalent to an effective black-body temperature difference of around −0.05 times the height of the temperature step and this value increases to zero at about 10 kilometers range and to a maximum of about +0.04 at 60 kilometers range, falling to about +0.01 at 200 kilometers range. The denominator $S_3-S_4$ of the range function has a value at zero range equivalent to an effective difference black-body temperature of around 0.2 times the height of the temperature step and this value increases and a maximum of about 0.27 at some 5 kilometers range. Thereafter the value $S_4$ is sensibly zero and the value follows the value $S_3$, falling asymptotically to zero.

Figure 7:
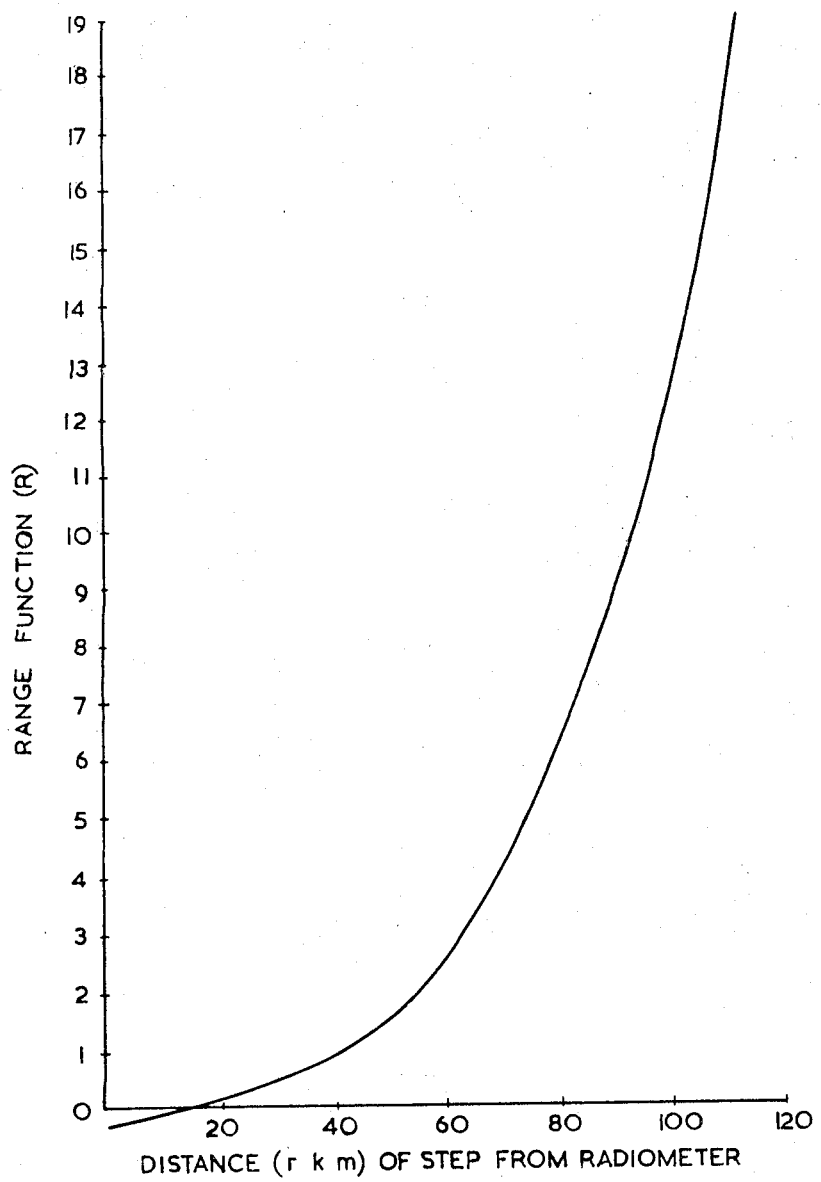
FIG. 7 is a graph of range function plotted against distance from a radiometer.

FIG. 7 is a graph of range function plotted against distance from a radiometer: this is a function which increases rapidly with range as will be readily apparent from consideration of the graphs of FIG. 6.

A likely way for the radiometer to be used would be as follows. In normal flight the radiometer would be used in a search mode, not scanning, but receiving radiation from a horizontal path ahead of the aircraft. In this mode the radiometer would be responsive only to the first channel and thus would have the maximum capability of detecting a temperature rise ahead of the aircraft. Once such a temperature rise is detected, channel 2 also would be monitored and the signal $S_1-S_2$ generated. However, this signal has a higher amount of noise than either the signal $S_1$ or the signal $S_2$ by themselves and so it may be necessary to use multilook correlation to limit the false alarm rate. A total of 10 looks, taken in sequence should occupy less than a minute, during which time the signal should be increasing. An estimate of the temperature rise can be made and if necessary a preliminary warning given to the pilot At such a time, the channel 3 also would be monitored and the signal $(S_1-S_2)/S_3$ generated. Such a signal is identical with that illustrated in FIG. 7 down to a range of some 10 kilometers. Finally, the range function R may be generated and used to give an exact range for the clear-air turbulence.

Figure 8:
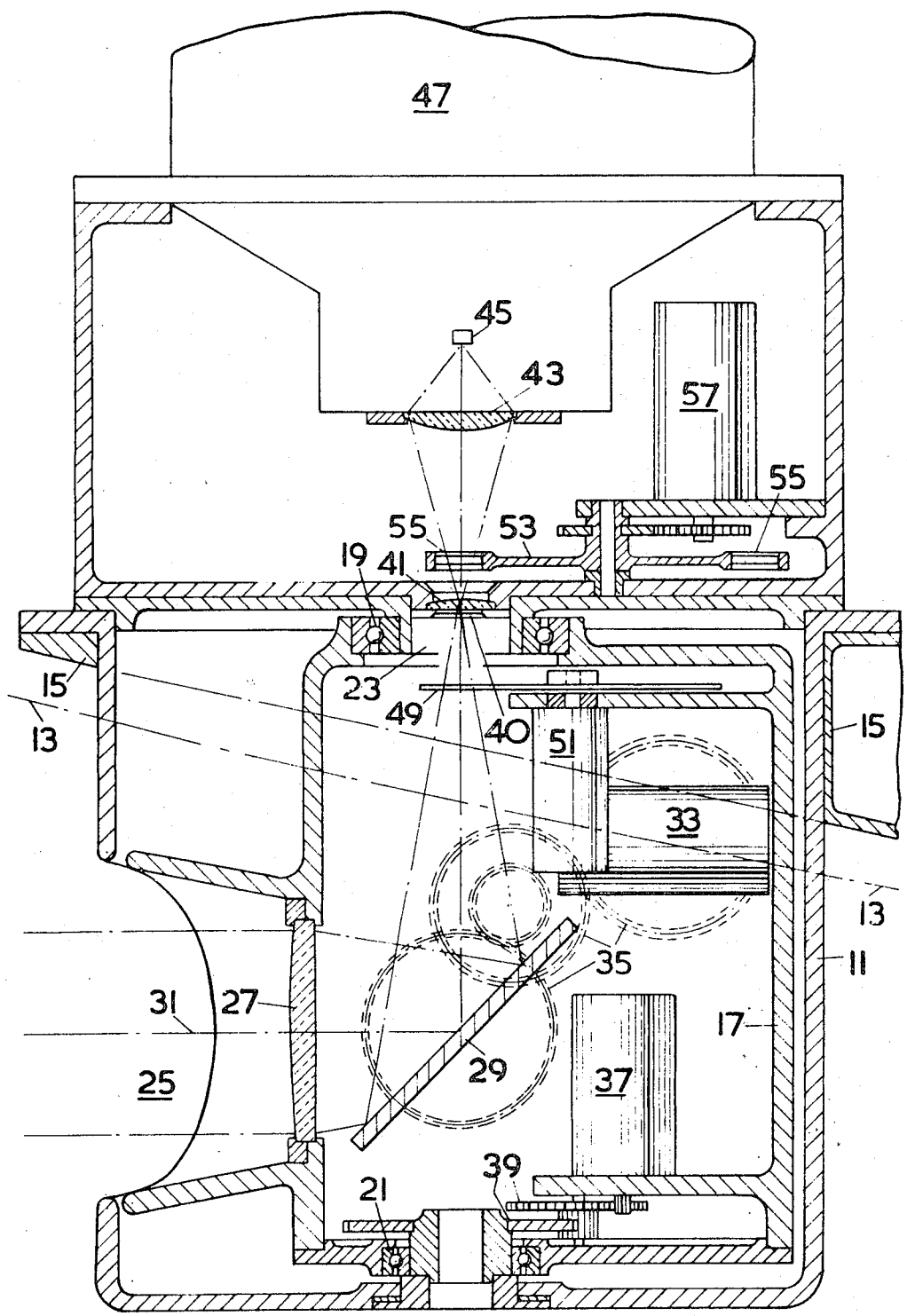
FIG. 8 is a cross-sectional diagram of a radiometer embodying the invention.

FIG. 8 is a cross-sectional diagram of a radiometer embodying the invention. A housing 11 is fixed in an aircraft, the skin of which is shown at 13, by mountings 15. A turret 17 is free to rotate about a vertical axis within the housing 11 on an upper bearing 19 and a lower bearing 21. The upper bearing 19 has a central opening 23 to allow infrared radiation to pass through it. An orifice 25 in the forward portion of the housing 11 admits radiation to the inside of the turret 17 via a window 27 transparent to infrared radiation of the frequencies of interest.

A mirror 29 is mounted in the turret 17 and is free to rotate about an axis perpendicular to the axis of rotation of the turret 17 and parallel to the window 27. The mirror 29 is generally at 45° to the axis of rotation of the turret 17, and is thereby adapted to deflect radiation incident on the window 27 through the opening 23. Therefore to be transmitted through the opening 23 radiation must be received along a sight line 31 which varies in space according to the attitude of the aircraft and which varies relative to the axis of rotation of the turret 17 according to the angle of the mirror 29 relative to the axis of rotation of the turret 17. It is therefore possible to stabilize the sight line 31 in direction in space by controlling the angle between the mirror 29 and the axis of rotation of the turret 17. This is achieved by a gyroscope 33 sensitive to pitching of the aircraft and driving a train of gears 35 which in turn control the angle between the mirror 29 and the axis of rotation of the turret 17.

Similarly the sight line 31 is controlled in azimuth by the rotation of the turret 17 within the housing 11 under the control of a second gyroscope 37 sensitive to yaw in the aircraft. The gyroscope 37 drives the turret 17 on its axis relative to the housing 11 via a train of gears 39. This arrangement may also be used for scanning the sight line 31 in azimuth, whereby radiometer readings may be taken to the left and to the right of the course of the aircraft: if there is a strong possibility of clear-air turbulence ahead of the aircraft then it is convenient to be able to detect whether the situation would be improved by altering course, and readings of up to 45° on either side of the course of the aircraft are very useful.

Radiation incident on the radiometer from distant parts of the atmosphere is brought to a focus at the central opening 23 either by the window 27 being a convex lens or by the mirror 29 being a concave mirror. The central opening 23 contains a field stop 40 and field lens 41 and beyond the field stop 40 and field lens 41 is a projection lens 43 which is arranged for throwing the radiation on a detector 45 mounted inside a cryostat unit 47. A chopper disk 49, driven by a chopper motor 51, is interposed between the mirror 29 and the central opening 23. A filter disk 53 contains a plurality of filters 55, which are interposed between the field stop 40 and field lens 41 and the projection lens 43. The filter disk is controlled by a filter motor 57.

The window 27 and the lenses 41 and 43 are made of infrared wide-band transmitting material, for example germanium. Similarly the surface of the mirror 29 is made of infrared wide-band reflecting material, for example the mirror 29 may be made of aluminum, nickel plated and coated with gold.

The entrance aperture of the radiometer is defined by the window 27 and the instrument field of view is defined by the mechanical field stop 40, which is in the focal plane of the window 27/mirror 29 optical system and the size of which is defined by the required field of view and the focal length of the window 27/mirror 29 system. The function of the field lens 41 is to project a real image of the window 27 on the projection lens 43. The projection lens 43 then projects a real image of the field stop 40 on the detector 45.

The detector 45 may be a mercury cadmium telluride detector cooled to 77° K. by the cryostat 47 or a copper-doped germanium detector cooled to liquid helium temperatures by the cryostat 47.

Figure 9:
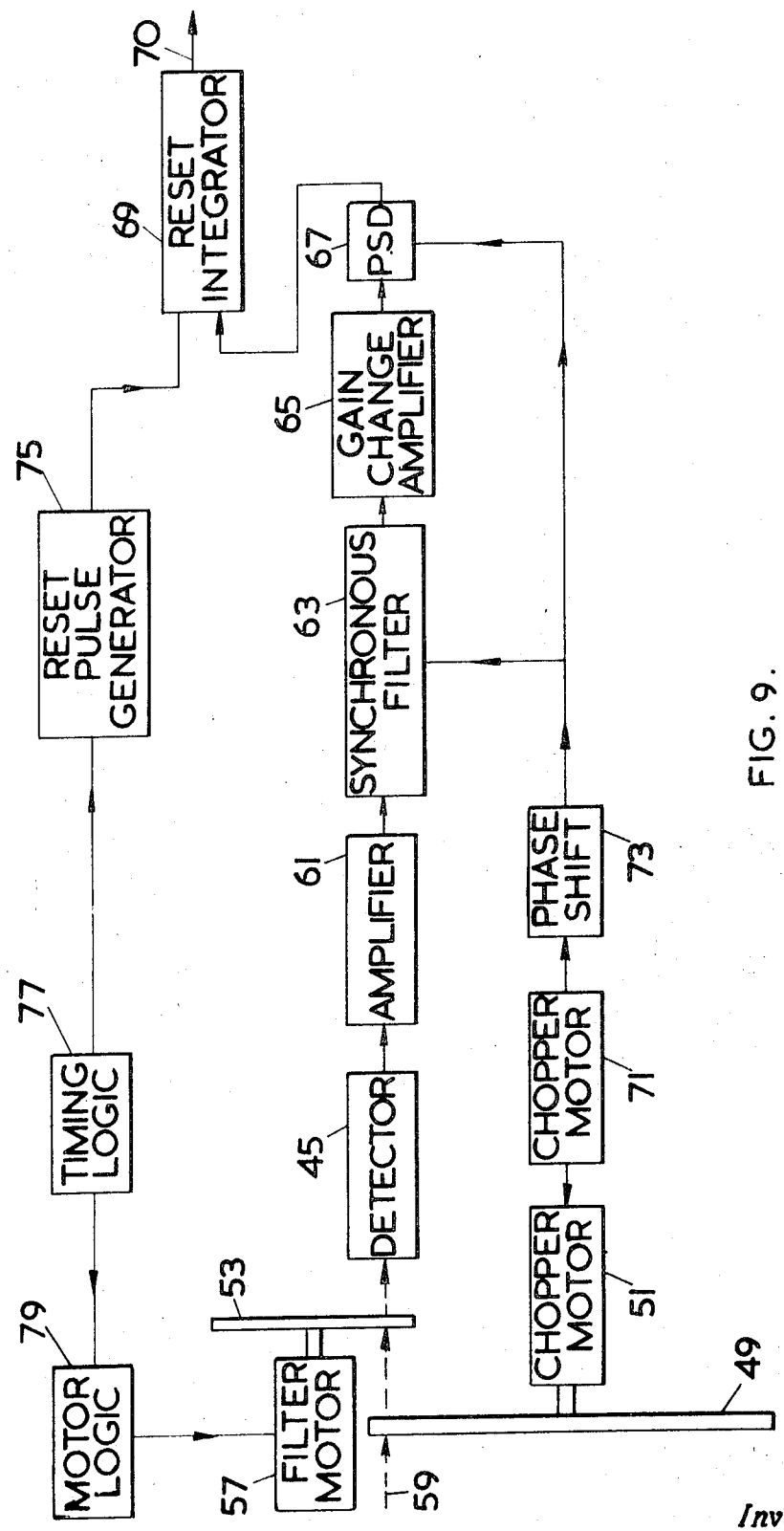
FIG. 9 is a block schematic diagram of a possible electronics system for the radiometer apparatus.

FIG. 9 is a block schematic diagram of a possible electronics system for the radiometer apparatus. FIG. 9 shows the detector 45 being illuminated along a light path 59 via the chopper disk 49, driven by the chopper motor 51, and the filter disk 53, controlled by the filter motor 57. The output of the detector 45 is fed through an amplifier 61, a synchronous filter 63, a gain-change amplifier 65 and a phase-sensitive detector 67 to a resettable integrator 69. The chopper motor 51 is driven by a chopper drive unit 71, which also supplies, via a phase shift unit 73 the synchronous filter 63 and the phase-sensitive detector 67. A reset pulse generator 75 is connected to reset the resettable integrator 69. The filter motor 57 is controlled by a timing logic unit 77 via a motor logic unit 79. The timing logic unit 77 also controls the reset pulse generator 75.

The action of the circuit is as follows. Light falling on the detector 45 via the path 59 is chopped by the chopper disk 49 under the control of the chopper motor 51 and is filtered by the appropriate filter in the filter disk 53 so that only the wavelength called for will fall on the detector 45. The low-level signal from the detector 45 will be fed via the amplifier 61 (which includes a low-noise pre-amplifier and a main amplifier) to the synchronous filter 63. The synchronous filter 63 consists of a series-connected resistor followed by a first parallel-connected capacitor in series with a first electronic switch and a second parallel-connected capacitor in series with a second electronic switch. The first electronic switch is switched in phase with the output of the phase shift unit 73 and the second electronic switch is switched in antiphase with the phase shift unit 73. The function of the unit is to limit the noise bandwidth before further amplification. The output of the synchronous filter 63 is applied to the amplifier 65 and thence to the phase-sensitive detector 67, where it is synchronously rectified and applied to the integrator 69. After, say, one second the output of the integrator 69 will be sampled via its output channel 70 and it will be immediately reset by a pulse from the reset pulse generator 75. The timing logic unit 77 will control both the reset pulse generator 75 and the motor logic unit 79 which controls (via the filter motor 57) the filter disk 53, and hence the wavelength received by the detector 45. The output 70 may be recorded in any suitable manner, for example by a tap recorder (not shown).

It is required to produce both difference and quotient functions from a set of four consecutive samples emerging from the channel 70. To this end a second integrator (not shown) may be attached to he output of the signal-channel main amplifier 65 and arranged so that one signal is integrated from a zero starting level after which the signal to be subtracted from it is fed in with the opposite polarity and for the same period of time; at the end of this period the signal at the output of the integrator is the difference between the two input signals.

Quotient functions may be derived by various means. One method is to use one signal to set the gain of an amplifier, while the other signal is passed through it in such a way that the output is proportional to the ratio of the two signals. Alternatively one signal may be used to set the amplitude of a pulse train while the other determines the width of each pulse. The area under the pulse can readily be arranged to be proportional to the ratio of the two signals, the wanted signal being recovered by means of a DC coupled low-pass filter.

The seven filters 55 on the filter disk 53 may be arranged on the filter disk 53 so that a set of four consecutive filters may be selected in every case, by arranging the filters in the following order on the filter disk 53: 1, 2, 4, ~100, 8, 16, 32. In this way the motor logic 79 may be simplified, and may be arranged to switch any group of four filters in sequence in synchronism with the signal-sampling electronics. Simple filter-position detectors (for example reed switches) will enable the various signals to be unambiguously identified and processed.

The various filter sequences may be selected automatically according to height, or by means of a preset program. The filters within the sequences may be similarly selected by an automatic timer or manually.

We claim:

1. An infrared radiometer apparatus for detecting clear-air turbulence from an aircraft comprising:
    a first bandpass filter means for passing radiation from the atmosphere having only wavelengths in a first sub-band within an absorption band of a given component of the atmosphere,
    a second bandpass filter means for passing radiation from the atmosphere having only wavelengths in a second sub-band within said absorption band, said second sub-band having a different generalized absorption coefficient from said first sub-band,
    a third bandpass filter means for passing radiation from the atmosphere having only wavelengths in third sub-band within said absorption waveband, said third sub-band having a different generalized absorption coefficient from said first and said second sub-bands,
    infrared detector means located in the path of radiation passing through said first, second and third bandpass filter means and sensitive to radiation passing therethrough for generating first, second and third signals corresponding respectively to radiation having wavelengths in said first, second and third sub-bands, and
    quotient-indicating means responsive to the magnitude of said first, said second and said third signals and indicative of a quotient function representing the difference between the magnitude of said first signal and the magnitude of said second signal, the difference being divided by the magnitude of said third signal.

2. A radiometer apparatus as claimed in claim 1 and wherein one and the same detector is sensitive to incident radiation in said first, said second and said third sub-bands.

3. A radiometer apparatus as claimed in claim 1 and wherein said first, second and third bandpass filter means are operable with radiation from the atmosphere having only wavelengths in sub-band within the carbon dioxide absorption waveband at and around 15 microns.

4. A radiometer apparatus as claimed in claim 1 having certain line of sight usable on an aircraft and further comprising means for stabilizing said line of sight against aircraft pitching, and means for scanning in azimuth said line of sight.

5. A radiometer apparatus as claimed in claim 1 and further comprising
    a first housing member for housing the optics of said radiometer apparatus,
    a second housing member rotatable within said first housing member about an axis perpendicular to said line of sight,
    a mirror within said second housing member for deflecting incoming radiation towards said filter means,
    a first gyroscopic means, sensitive to aircraft pitching, for controlling the angle between said mirror and said axis about which said second housing member is rotatable, and
    a second gyroscopic means for rotating said second housing member and scanning in azimuth said line of sight.

6. A radiometer apparatus as claimed in claim 1 and further comprising:
    a fourth bandpass filter means for passing radiation from the atmosphere having only wavelengths in a fourth sub-band within said absorption waveband, said fourth sub-band having a different generalized absorption coefficient from that of said first, said second and said third sub-bands,
    said detector means being sensitive to radiation passing in said fourth sub-band for generating a fourth signal corresponding to radiation in said fourth sub-band,
    and wherein said quotient-indicating means is responsive also to the magnitude of said fourth signal corresponding to radiation having wavelengths in said fourth sub-band and indicative also of a quotient function representing the quotient of the difference between the magnitude of said first signal and said second signal and the difference between the magnitude of said third signal and said fourth signal.

7. A radiometer apparatus as claimed in claim 6 and wherein one and the same detector is sensitive to incident radiation in said first, said second and said third sub-bands, 8. A radiometer apparatus as claimed in claim 6 and wherein one and the same detector is sensitive to incident radiation in said first, second, third and fourth sub-bands.

9. A radiometer apparatus as claimed in claim 6 and wherein said first, second, third and fourth bandpass filter means are operable with radiation from the atmosphere having only wavelengths in sub-band within the carbon dioxide absorption waveband at and around 15 microns.

10. A radiometer apparatus as claimed in claim 6 and having a certain line of sight usable on an aircraft and further comprising: means for stabilizing said line of sight against aircraft pitching and means for scanning in azimuth said line of sight.

11. A radiometer apparatus as claimed in claim 10 and further comprising
    a first housing member for housing the optics of said radiometer apparatus,
    a second housing member rotatable within said first housing member about an axis perpendicular to said line of sight,
    a mirror within said second housing member for deflecting incoming radiation towards said filter means,
    a first gyroscopic means, sensitive to aircraft pitching, for controlling the angle between said mirror and said axis about which said second housing member is rotatable, and
    a second gyroscopic means for rotating said second housing member and scanning in azimuth said line of sight.

12. A radiometer apparatus as claimed in claim 6 and further comprising:
    a further set of bandpass filter means in addition to said first, second, third and fourth bandpass filter means,
    a filter housing member for housing said first, second, third and fourth bandpass filter means and said further set of bandpass filter means, and
    means for rotating said filter housing member and for removing said further set of bandpass filter means from location in the path of incoming radiation and presenting said first, second, third and fourth bandpass means in location of the path of incoming radiation.

13. A radiometer apparatus as claimed in claim 12 and wherein said indicating means contains a resettable integrator means for sampling signals corresponding to radiation passed by said first, second, third and fourth bandpass filter means and by said further set of bandpass filter means.

14. A radiometer apparatus as claimed in claim 13 and further comprising:
    logic timing means for timing rotations of said filter housing member and for timing reset of said resettable integrator between states corresponding to sampling of signals corresponding to radiation passed through said first, second, third and fourth bandpass filter means and sampling of signals corresponding to radiation passed through said further set of bandpass filter means.

15. A radiometer apparatus as claimed in claim 14 and wherein said first bandpass filter means is operable with radiation in a sub-band having a generalized absorption coefficient approximately twice that of the band radiation with which said second bandpass filter means is operable and said third bandpass filter means is operable with radiation in a sub-band having a generalized absorption coefficient large compared with that of the sub-band of radiation with which said second bandpass filter means is operable.

16. A radiometer apparatus as claimed in claim 14 and wherein one and the same detector is sensitive to incident radiation in said first, second, third and fourth sub-bands.

17. A radiometer apparatus as claimed in claim 14 and having a certain line of sight usable on an aircraft and further comprising:

means for stabilizing said line of sight against aircraft pitching and means for scanning in azimuth said line of sight.

18. A radiometer apparatus as claimed in claim 17 and further comprising
 a first housing member for housing the optics of said radiometer apparatus,
 a second housing member rotatable within said first housing member about an axis perpendicular to said line of sight,
 a mirror for deflecting incoming radiation towards said filter means,
 a first gyroscopic means, sensitive to aircraft pitching, for controlling the angle between said mirror and said axis about which said second housing member is rotatable, and
 a second gyroscopic means for rotating said second housing member and scanning in azimuth said line of sight.

19. A radiometer apparatus as claimed in claim 1 and further comprising:
 a further set of bandpass filter means in addition to said first, second, third and fourth bandpass filter means,
 a filter housing member for housing said first, second, third and fourth bandpass filter means and said further set of bandpass filter means and
 means for rotating said filter housing member and for removing said further set of bandpass filter means from location in the path of incoming radiation and presenting said first, second, third and fourth bandpass means in location of the path of incoming radiation.

20. A radiometer apparatus as claimed in claim 19 and wherein said indicating means contains a resettable integrator means for sampling signals corresponding to radiation passed by said first, second, third and fourth bandpass filter means and by said further set of bandpass filter means.

21. A radiometer apparatus as claimed in claim 20 and further comprising:
 logic timing means for timing rotations of said filter housing member and for timing reset of said resettable integrator between states corresponding to sampling of signals corresponding to radiation passed through said first, second, third and fourth bandpass filter means and sampling of signals corresponding to radiation passed through said further set of bandpass filter means.

22. A radiometer apparatus as claimed in claim 21 and wherein said first bandpass filter means is operable in a sub-band having a generalized absorption coefficient approximately twice that of the sub-band of radiation with which said second bandpass filter means is operable and
 said third bandpass filter means is operable with radiation in a sub-band having a generalized absorption coefficient large compared with that of the sub-band of radiation with which said second bandpass filter means is operable.

23. A radiometer apparatus as claimed in claim 22 and wherein said first, second and third bandpass filter means are operable with radiation from the atmosphere having only wavelengths in sub-bands within the carbon dioxide absorption waveband at and around 15 microns.

\* \* \* \* \*